United States Patent [19]
Getman et al.

[11] Patent Number: 5,844,491
[45] Date of Patent: Dec. 1, 1998

[54] APPARATUS FOR ESTABLISHING AND/OR MONITORING A PREDETERMINED FILLING LEVEL IN A CONTAINER

[75] Inventors: Igor Getman; Sergej Lopatin, both of Lörrach, Germany

[73] Assignee: Endress + Hauser GmbH + Co., Maulburg, Germany

[21] Appl. No.: 59,139

[22] Filed: Apr. 13, 1998

[30] Foreign Application Priority Data

Apr. 30, 1997 [EP] European Pat. Off. ............. 97107153

[51] Int. Cl.$^6$ .................................................. G08B 21/00
[52] U.S. Cl. ..................... 340/612; 340/620; 340/621; 73/290 V; 310/323; 310/328
[58] Field of Search ..................... 340/612, 616, 340/620, 621, 618, 624; 73/290 V, 290 R; 310/323, 328

[56] References Cited

U.S. PATENT DOCUMENTS

| | | | |
|---|---|---|---|
| 4,193,010 | 3/1980 | Kompanek | 310/330 |
| 4,594,584 | 6/1986 | Pfeiffer et al. | 340/620 |
| 4,841,256 | 6/1989 | Gastgeb | 331/25 |
| 4,915,145 | 4/1990 | Schirmacher | 141/95 |
| 5,191,316 | 3/1993 | Dreyer | 340/621 |
| 5,247,832 | 9/1993 | Umezawa et al. | 73/290 V |
| 5,408,168 | 4/1995 | Pfandler | 318/642 |
| 5,532,527 | 7/1996 | Zatler et al. | 307/118 |
| 5,554,937 | 9/1996 | Sanders et al. | 324/664 |
| 5,578,994 | 11/1996 | Cherek et al. | 340/618 |
| 5,625,343 | 4/1997 | Rottmar | 340/620 |
| 5,631,633 | 5/1997 | Dreyer et al. | 340/621 |
| 5,717,383 | 2/1998 | Dreyer et al. | 340/621 |
| 5,730,025 | 3/1998 | Getman et al. | 73/290 V |
| 5,743,134 | 4/1998 | Dreyer | 73/290 V |
| 5,755,136 | 5/1998 | Getman et al. | 73/291 V |
| 5,778,726 | 7/1998 | Muller et al. | 73/290 V |

FOREIGN PATENT DOCUMENTS

| | | |
|---|---|---|
| 27 49 077 | 6/1978 | Germany . |
| 39 31 453 | 2/1991 | Germany . |
| 42 01 360 | 7/1993 | Germany . |
| 44 02 234 | 4/1995 | Germany . |
| 44 19 617 | 12/1995 | Germany . |
| 44 29 236 | 3/1996 | Germany . |
| 195 23 461 | 7/1996 | Germany . |

*Primary Examiner*—Thomas J. Mullen, Jr.
*Assistant Examiner*—Toan N. Pham
*Attorney, Agent, or Firm*—Bose McKinney & Evans

[57] ABSTRACT

An apparatus for establishing and/or monitoring a predetermined filling level in a container is provided, in which a reception signal (E) is equal to the measurement signal, and in which a fixed phase difference ($\Delta\phi_R$), which is independent of the oscillation quality of the apparatus, exists between a first transmission signal ($S_1$), and a reception signal (E) at a resonant frequency ($f_r$). The apparatus comprises a mechanical oscillatory structure (1) and a piezoelectric element (2), which has a first region (I) having a reception electrode (21), a second region (II) having a first transmission electrode (22) and a third region (III) having a second transmission electrode (23), the two transmission electrodes (22, 23) having an identical form and being arranged symmetrically with respect to one another and to the reception electrode (21), in the first and in the second region (I, II), the piezoelectric element having a polarization which is in the opposite direction to a polarization of the third region (III), and a first transmission signal ($S_1$) being applied to the first transmission electrode (22), which first transmission signal has the same amplitude as and is in antiphase with a second transmission signal ($S_2$), which is applied to the second transmission electrode (23).

6 Claims, 3 Drawing Sheets

APPARATUS FOR ESTABLISHING AND/OR MONITORING A PREDETERMINED FILLING LEVEL IN A CONTAINER

This is a provisional application Ser. No. 60/051,514, filed Jul. 2, 1997.

The invention relates to an apparatus for establishing and/or monitoring a predetermined filling level in a container.

Filling level limit switches of this type are employed in many branches of industry, in particular in the chemical industry and in the foodstuffs industry. They serve the purpose of limit level detection and are used, for example, as protection against overfilling or as a safeguard against pumps running dry.

DE-A 44 19 617 describes an apparatus for establishing and/or monitoring a predetermined filling level in a container. This apparatus comprises:
a mechanical oscillatory structure, which is fitted at the level of the predetermined filling level,
an electromechanical transducer,
which has at least one transmitter,
to which an electrical transmission signal is applied and which excites the mechanical oscillatory structure to produce oscillations, and
which has a receiver,
which picks up the mechanical oscillations of the oscillatory structure and converts them into an electrical reception signal,
an evaluation unit,
which picks up the reception signal and determines its frequency, compares this signal with a reference frequency and generates an output signal which indicates that the mechanical oscillatory structure is covered by a charge material if the frequency has a value which is less than the reference frequency, and that it is not covered if the value is greater, and
a control loop, which regulates a phase difference existing between the electrical transmission signal and the electrical reception signal to a specific, constant value at which the oscillatory structure oscillates at a resonant frequency.

The control loop is formed, for example, by amplifying the reception signal and feeding it back via a phase shifter to the transmission signal.

DE-C 195 23 461 describes an apparatus for establishing and/or monitoring a predetermined filling level in a container, in which a mechanical oscillatory structure, which is fitted at the level of the predetermined filling level, is excited to produce oscillations by a single piezoelectric element. This element picks up the oscillations of the mechanical oscillatory structure and converts them into an electrical reception signal. It therefore serves both as a transmitter and as a receiver and has a transmission electrode and a reception electrode.

These apparatuses are complex oscillatory systems which are each composed of a mechanical oscillatory structure, an electromechanical transducer and the control loop. The individual components are not completely isolated electrically and separated mechanically from one another. Both electrical and mechanical coupling occurs.

Consequently, the reception signal comprises not only the desired measurement signal, which is ascribed to the oscillation of the respective mechanical oscillatory structure, but also additional signals produced by the aforementioned coupling.

To date, it has not been possible to employ apparatuses of this type additionally for measurements in highly viscous media or in hydrous or viscous foams, since reliable excitation of the mechanical oscillatory structure to produce oscillations at the resonant frequency is not ensured in these applications.

The fixed value of the phase difference corresponds to the resonance of the system when the oscillatory structure oscillates in gases or in liquids. However, if the oscillation quality of the apparatus is reduced for any reason, then the consequence of this is that the fixed value of the phase difference no longer exists. There is no frequency at which the mechanical oscillatory structure executes oscillations having an amplitude other than zero and the phase difference has the fixed value. This phase difference cannot be set by the control loop. Incorrect functioning consequently occurs.

A reduction in the oscillation quality occurs, for example, when the movement of the mechanical oscillatory structure is attenuated, for example by the latter being immersed in a viscous medium or in a liquid-containing or viscous foam. Furthermore, the oscillation quality is reduced by energy losses within the apparatus, for example due to instances of material fatigue or instances of asymmetry, for example on account of asymmetrical deposit formation, which lead to asymmetrical restoring forces. In principle, any type of energy loss, be it oscillation energy released to a charge material or energy released to the container via a fastening of the apparatus, leads to a reduction in the oscillation quality.

One object of the invention is to specify an apparatus for establishing and/or monitoring a predetermined filling level in a container, in which the reception signal is as far as possible identical to the desired measurement signal and does not contain any additional signals caused by coupling.

A further object of the invention consists in specifying an apparatus of this type in which a fixed phase difference, which is independent of the oscillation quality of the apparatus, exists between the transmission signal and the reception signal at the resonant frequency of the mechanical oscillatory structure.

This is achieved according to the invention by means of an apparatus for establishing and/or monitoring a predetermined filling level in a container, which apparatus comprises:
a mechanical oscillatory structure, which is fitted at the level of the predetermined filling level,
a piezoelectric element,
which excites the oscillatory structure to produce oscillations and picks up its oscillations,
which has at least three regions,
a first region having a reception electrode, a second region having a first transmission electrode and a third region having a second transmission electrode,
the two transmission electrodes having an identical form and being arranged symmetrically with respect to one another and to the reception electrode,
in the first and in the second region, the piezoelectric element having a polarization which is in the opposite direction to a polarization of the third region, and
a first transmission signal being applied to the first transmission electrode, which first transmission signal has the same amplitude as and is in antiphase with a second transmission signal, which is applied to the second transmission electrode.

In accordance with one embodiment of the invention, a control loop is provided, which regulates a phase difference existing between the first transmission signal and the reception signal to a specific, constant value at which the oscillatory structure oscillates at a resonant frequency.

In accordance with a further embodiment, a reference electrode connected to a reference potential is arranged on the piezoelectric element.

In accordance with a further embodiment, the piezoelectric element is in the form of a disk and the reception electrode and the two transmission electrodes are arranged on a circle surface of said element.

In accordance with a further embodiment, the two transmission electrodes are annulus segments and are arranged on annulus segments of the circle surface which are diametrically opposite one another.

In accordance with a further embodiment, the first transmission signal is applied to an inverter and the second transmission signal is equal to an output signal of the inverter.

The invention and further advantages will now be explained in more detail with reference to the figures of the drawing, in which figures an exemplary embodiment is illustrated; identical elements are provided with identical reference symbols in the figures.

Figure 1:
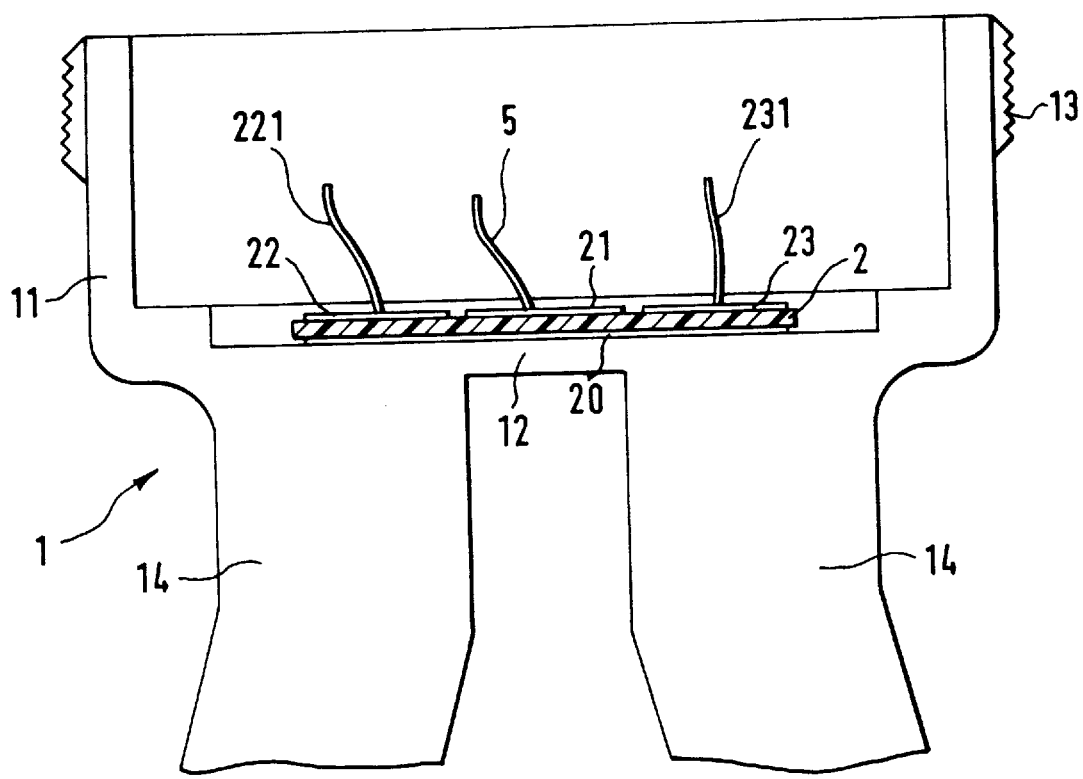
FIG. 1 shows a longitudinal section through a mechanical oscillatory structure having a piezoelectric element.

FIG. 1 shows a longitudinal section through an exemplary embodiment of a mechanical oscillatory structure 1. It has an essentially cylindrical housing 11, which is closed off flush at the front by a circular diaphragm 12. A thread 13 is integrally formed on the housing 11, by means of which thread the apparatus can be screwed into an opening (not illustrated), which is arranged at the level of the predetermined filling level, in a container. Other fastening methods which are known to a person skilled in the art, for example by means of flanges integrally formed on the housing 11, can likewise be employed.

Two oscillating bars 14 which point into the container are integrally formed on the diaphragm 12 on the outside of the housing 11. These bars are caused to oscillate perpendicularly to their longitudinal axis by means of a piezoelectric element 2 which is in the form of a disk and is arranged on the diaphragm 12 in the interior of the housing 11.

However, the invention is not restricted to mechanical oscillatory systems having two oscillating bars; it can also be employed in limit switches which have only one or no oscillating bars. In the cases mentioned last, for example only the oscillating diaphragm comes into contact with a charge material situated in the container.

It is also possible to employ apparatuses in which the piezoelectric element 2 is mounted on a second diaphragm, which is arranged parallel to the diaphragm which closes off the housing. In this case, the oscillation of the second diaphragm is transmitted to the diaphragm which closes off the housing in that, for example, the second diaphragm is clamped in or retained on its outer edge and a mechanical connection exists from its center to the center of the other diaphragm. This connection is, for example, a tensioning bolt connecting both diaphragms or a plunger integrally formed on the inner diaphragm.

If the housing 11 is composed of metal, then the piezoelectric element 2 can be fitted directly on the diaphragm 12, for example by bonding. The housing, which is preferably grounded, then serves as a reference electrode.

Figure 2:
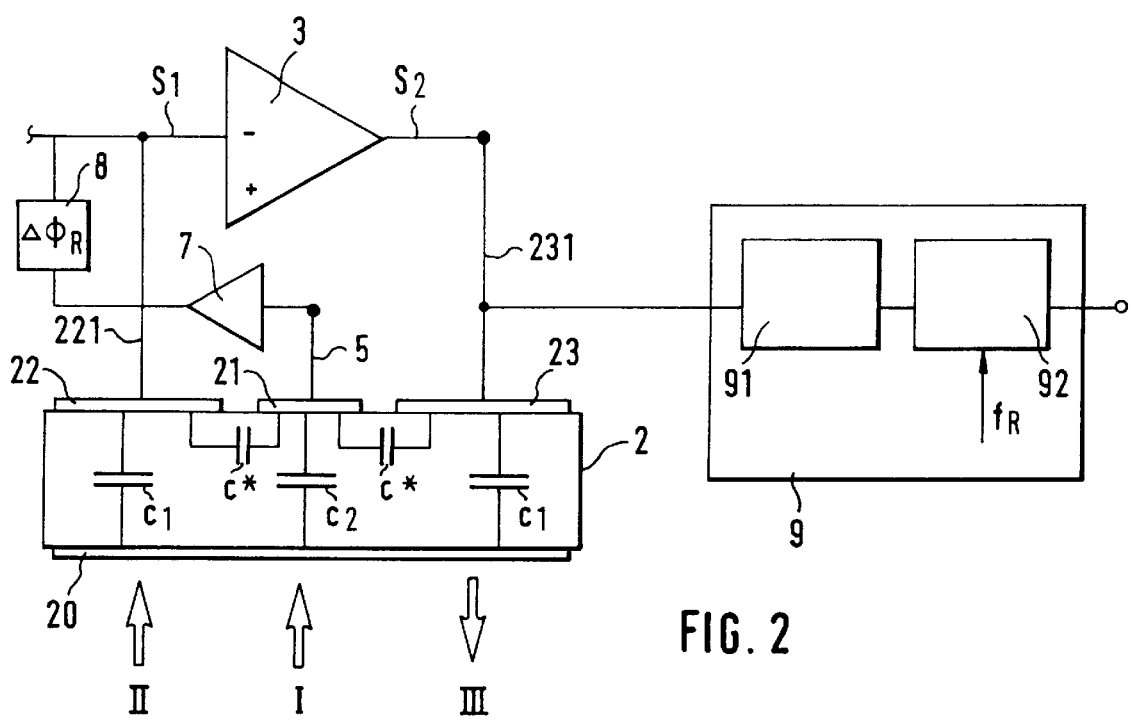
FIG. 2 shows a diagrammatic illustration of the piezoelectric element of FIG. 1 and a circuit connected thereto.

If, on the other hand, the housing 11 is composed of an insulator, then a reference electrode 20 must be arranged between the diaphragm 12 and the piezoelectric element 2, which reference electrode must be connected to a reference potential, preferably to the ground potential. FIG. 2 shows a diagrammatic illustration of the piezoelectric element 2.

Figure 3:
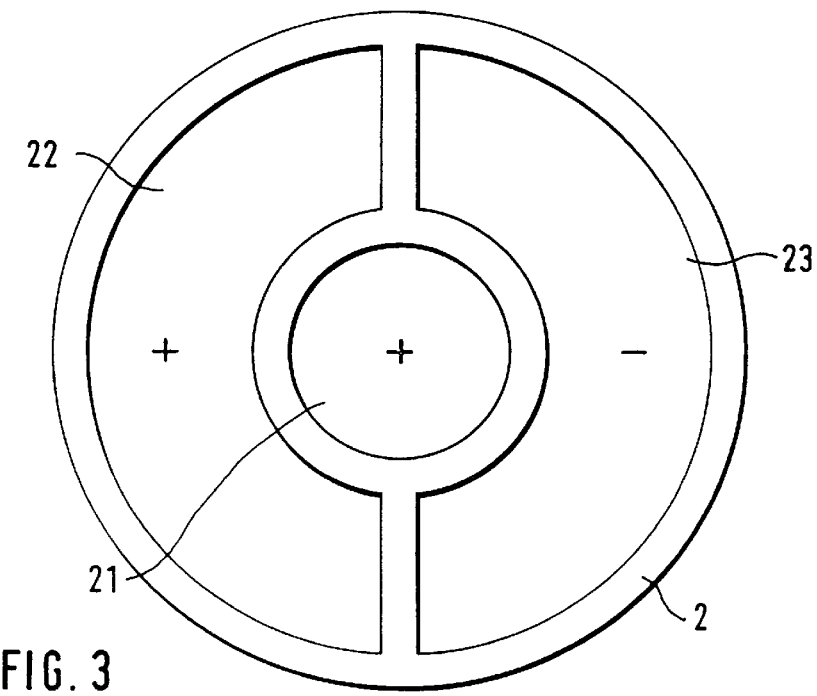
FIG. 3 shows an inventive arrangement of the transmission and reception electrodes.

One reception electrode 21 and two transmission electrodes 22, 23 are arranged on a circle surface of the piezoelectric element 2 which is remote from the diaphragm. This is illustrated in FIG. 3. The reception electrode 21 is connected to a reception signal line 5, via which a reception signal E is available. The two transmission electrodes 22, 23 are respectively connected to a transmission signal line 221, 231. Transmission signals $S_1$, $S_2$, for example AC voltages, present on these transmission signal lines 221, 231 cause the piezoelectric element 2 and the diaphragm 12, which is permanently connected thereto, to produce flexural vibrations. This causes the oscillating bars 14, which are integrally formed on the diaphragm 12 at their ends, to produce oscillations perpendicular to their longitudinal axis.

Conversely, an oscillation of the oscillating bars 14 effects a flexural vibration of the diaphragm 12 and of the piezoelectric element 2 which is permanently connected thereto.

The reception signal E has an amplitude A which is larger, the larger the mechanical oscillation amplitude of the oscillating bars 14 is. Exploiting this fact, the apparatus is preferably operated at its resonant frequency $f_r$. The mechanical oscillation amplitude has a maximum at the resonant frequency $f_r$.

If a harmonic oscillator is considered as an example of an ideal oscillatory system, then its oscillation amplitude has a single maximum as a function of the oscillation frequency. The phase difference between the oscillation excitation and the oscillation of the oscillator experiences a sudden phase change of 180° in the region of this maximum. At the resonant frequency, the oscillation amplitude is a maximum and the phase difference is 90°.

In apparatuses of this type, such as are disclosed in the prior art, just one transmission electrode and just one reception electrode are usually provided. Such an apparatus is made to oscillate at its resonant frequency $f_r$ by providing a control loop which regulates a phase difference existing between the electrical transmission signal and an electrode signal to a specific, constant value.

In a harmonic oscillator, attenuation or reduction of the oscillation quality effects a reduction in the maximum amplitude in the case of resonance. In such a case, the phase increases as a function of the frequency proceeds continuously rather than abruptly, to be precise it proceeds all the more slowly, the greater the attenuation or the reduction of the oscillation quality is. Overall, however, even with very great attenuation, a phase change of a total of 180° ensues and a phase difference of 90° exists at the resonant frequency. The fixed value, corresponding to resonance, of the phase difference of 90° always exists and is assumed at the resonant frequency In contrast to an ideal oscillator, coupling of an electrical and mechanical nature between the piezoelectric element 2, the transmission electrode, the reception electrode and the mechanical oscillatory structure exists in the abovementioned apparatuses from the prior art.

Mechanical coupling of the kind that might occur, for example, due to bracing of the piezoelectric element 2 is negligibly slight in the case of apparatuses having only a single piezoelectric element 2 and is therefore not taken into account below.

Electrical coupling exists between the transmission electrode and the reference electrode, between the reception electrode and the reference electrode, and between the reception electrode and the transmission electrode. This can be illustrated, in the form of an equivalent circuit diagram, by the capacitances connecting the respective electrodes.

The effect of this capacitive coupling is that a signal $E_1$ which differs from zero is present at the reception electrode even when the oscillating bars 14 are permanently restrained and the diaphragm 12 and the piezoelectric element 2 do not execute any mechanical motion.

The signal $E_1$ present at a reception electrode is composed of two components, namely a measurement signal $E_{M1}$ and an additional signal $E_{el1}$ governed by the electrical coupling.

$$E_l = E_{M1} + E_{el1}$$

The measurement signal $E_{M1}$ is based on the oscillation of the mechanical oscillatory structure and has a frequency-dependent amplitude $A_{M1}(f)$ and a frequency-dependent phase $\Delta\phi_{M1}(f)$. Here phase in each case denotes the phase offset of the respective component of the electrical signal $E_1$ with reference to the electrical transmission signal.

Figure 4A:
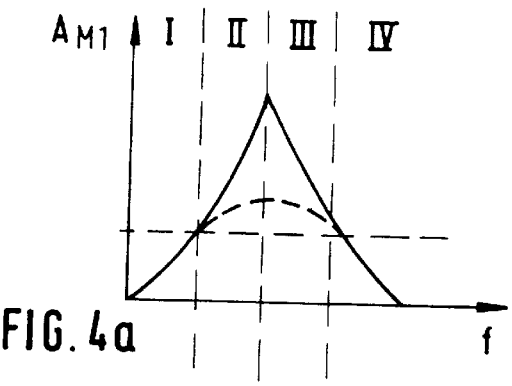
FIG. 4a shows the amplitude of the measured signal as a function of the frequency for a high and for a low oscillation quality.
Figure 4B:
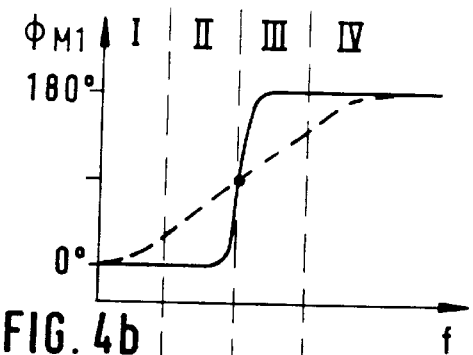
FIG. 4b shows the phase of the measurement signal as a function of the frequency for a high and for a low oscillation quality.

FIG. 4a shows the amplitude $A_{M1}(f)$ and FIG. 4b the phase $\Delta\phi_{M1}(f)$ of the measurement signal $E_{M1}$ as a function of the frequency f. The curves can be determined computationally by simulation calculations, for example by finite element calculations.

They can be measured experimentally by connecting the transmission signal line to a frequency generator and by determining the phase and amplitude of the oscillation of the oscillating bars 14 as a function of the frequency of the frequency generator, using a laser vibrometer, for example.

In both FIGS. 4a, 4b, the continuous line corresponds to an apparatus having a high oscillation quality and the dashed line corresponds to an apparatus having a low oscillation quality. In both cases, both the amplitude $A_{M1}(f)$ and the phase $\Delta\phi_{M1}(f)$ of the measurement signal have the profile which is typical of a harmonic oscillator and has already been described above.

The additional signal $E_{el1}$ has an essentially constant amplitude $A_{el1}$ and an essentially constant phase $\Delta\phi_{el1}$. In this case, too, phase denotes the phase offset of the respective component of the electrical signal $E_1$ with reference to the electrical transmission signal.

Figure 5A:
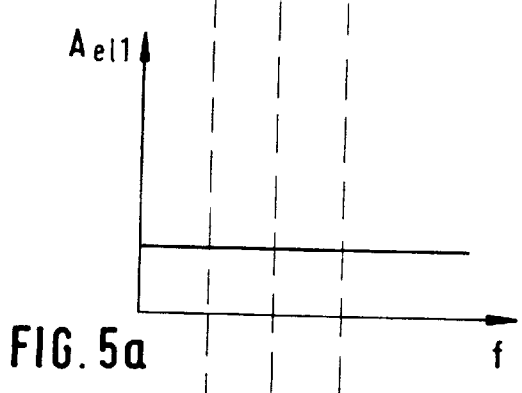
FIG. 5a shows the amplitude of an additional signal as a function of the frequency.
Figure 5B:
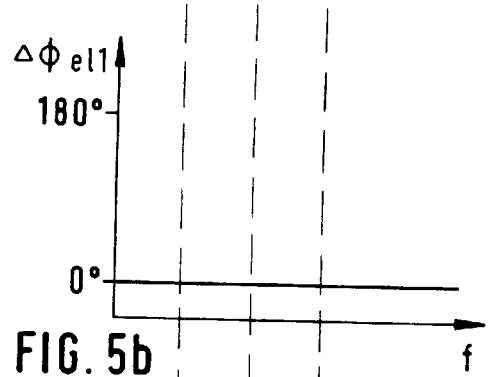
FIG. 5b shows the phase of a first additional signal as a function of the frequency.

The continuous line in FIG. 5a shows the amplitude $A_{el1}$ and the continuous line in FIG. 5b the phase $\Delta\phi_{el1}$ of the additional signal $E_{el1}$ as a function of the frequency f. These curves can also be determined by simulation calculations. They can be picked up experimentally, for example, by employing a non-polarized, piezoelectric element. In the case of the latter, no mechanical motion at all is produced by a transmission signal and the signal $E_1$ consequently corresponds to the additional signal $E_{el1}$ which is based on electrical coupling. The latter signal can be measured by means of an oscilloscope.

The amplitude $A_{el1}$ and the phases $\Delta\phi_{el1}$ of the additional signal $E_{el1}$ are unambiguously related to the mechanical structure of the respective apparatus and the electrical properties thereof. In the example, shown in FIGS. 4a, 4b, 5a, 5b, 6a and 6b, of an apparatus from the prior art as described at the beginning, the additional signal $E_{el1}$ as a phase of 0°.

Figure 6A:
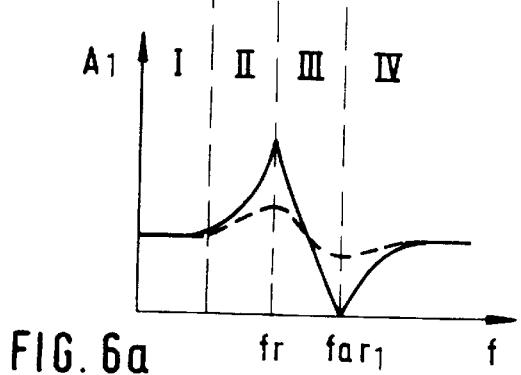
FIG. 6a shows the amplitude of the reception signal as a function of the frequency for a high and for a low oscillation quality.
Figure 6B:
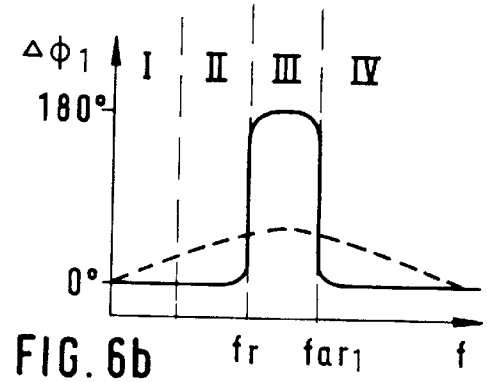
FIG. 6b shows the phase of the reception signal as a function of the frequency for a high and for a low oscillation quality.

FIG. 6a shows the amplitude $A_1(f)$ and FIG. 6b the phase $\Delta\phi_1(f)$ of the signal $E_1$. The two curves result from the phase- and amplitude-accurate superposition of the two above-described components of the signal $E_1$.

$$E_1 e^{i\Delta\phi 1} = A_{M1} e^{i\Delta\phi M1} + A_{el1} e^{i\Delta\phi el1}$$

Both curves each have four regions I, II, III, IV, which are described in a greatly simplified manner below.

In the outer regions I and IV, the additional signal $E_{el1}$ has the larger amplitude $A_{el1}$ and is consequently predominant. Consequently, the resulting phase $\Delta\phi_1$ essentially corresponds to the phase of the additional signal $\Delta\phi_{el1}$.

In the regions I and II, the two signals are in phase and are added. The amplitude $E_1$ rises continuously in these regions and has a maximum at the resonant frequency $f_r$. The signals are in antiphase in the regions III and IV. The amplitude $A_1$ decreases in the region III. It is zero at the upper region boundary. At this frequency, which is referred to as the antiresonant frequency $f_{ar1}$ below, the measurement signal $E_{M1}$ and the additional signal $E_{el1}$ have the same amplitude and opposite phases. The amplitude $A_1$ rises again in the region IV.

The phase $\Delta\phi_1$ is 0° in the regions I, II and IV and 180° in the region III.

Without precise knowledge of the additional signal $E_{el1}$, the measurement signal $E_{M1}$ cannot be determined from the signal $E_1$ of the reception electrode.

If the situation now arises where the mechanical oscillatory structure is damped or has a reduced oscillation quality, then the amplitude $A_{M1}(f)$ and phase $\Delta\phi_{M1}(f)$ of the measurement signal exhibit the profile illustrated by dashed lines in FIGS. 4a and 4b. The amplitude $A_{M1}(f)$ rises and falls considerably more slowly with the frequency and has a distinctly lower maximum value. The phase $\Delta\phi_{M1}(f)$ does not exhibit a sudden phase change, but rather rises continuously with the frequency. The greater the reduction in the oscillation quality of the system is, the lower the maximum value of the amplitude is and the lower the gradient of the phase is. However, the phase $\Delta\phi_{M1}(f)$ always reaches the values 0° and 180° asymptotically and it is still 90° at the resonant frequency. The additional signal $E_{el1}$ remains unchanged.

The amplitude $A_1(f)$ and phase $\Delta\phi_1(f)$ of the reception signal $E_1$ resulting from the amplitude- and phase-accurate superposition of the two components clearly differ from the case mentioned first, in which there was no reduction in the oscillation quality. The maxima of the amplitude $A_1(f)$ are a great deal less pronounced and the phase $\Delta\phi_1(f)$ has two continuous phase changes in opposite directions to one another instead of the two sudden phase changes each of 180° in opposite directions to one another. The maximum phase difference is clearly less than 180°. Depending on the oscillation quality of the system, it is even less than 90°.

If, therefore, damping of the mechanical oscillatory structure, for example in foam or in a viscous medium, or a different type of reduction in the oscillation quality of the system, occurs, then the phase difference $\Delta\phi_1$ between the electrical transmission signal and the electrical signal $E_1$ admittedly still has, as a function of the frequency, two continuous phase changes in opposite directions to one another, but the maximum phase difference may be very small. The maximum phase difference is smaller, the smaller the interval between the resonant frequency $f_r$ and the antiresonant frequency $f_{ar1}$ is.

By means of the control loop, of the kind which can be found in the prior art, the mechanical oscillatory system is excited to produce oscillations at the resonant frequency $f_r$, in that a fixed phase relationship, corresponding to resonance, between the transmission signal and the signal $E_1$ is established. In order that the apparatus described is functional in the uncovered state in conjunction with a high oscillation quality, the fixed phase difference $\Delta\phi_R$ is 90° in the case of the exemplary embodiment shown here.

If the previously described situation where the phase $\Delta\phi_1(f)$ of the signal no longer assumes this fixed value $\Delta\phi_R$ over the entire frequency range now occurs on account of the properties of the charge material or on account of a reduction in the oscillation quality of the apparatus, then reliable excitation of the mechanical oscillatory system is no longer possible. The apparatus is consequently not functional.

In contrast, an apparatus according to the invention not only generates an uncorrupted reception signal E, but is still functional even when the previously described apparatuses according to the prior art fail.

This is achieved according to the invention by virtue of the fact that the piezoelectric element 2 has at least three regions. The reception electrode 21 is arranged on a first region I, and the transmission electrodes 22, 23 are arranged on a second and a third region II, III, respectively. The piezoelectric element 2 is in the form of a disk and the reception electrode 21 and the two transmission electrodes 22, 23 are arranged on a circle surface of said element.

The two transmission electrodes 22, 23 have an identical form and are arranged symmetrically with respect to one another and with respect to the reception electrode 21.

As can be discerned from FIG. 3, the reception electrode 21 is arranged in the center of the piezoelectric element 2 and is circular. The two transmission electrodes 22, 23 are annulus segments. They are situated on mutually diametrically opposite annulus segments of the circle surface on both sides of the reception electrode 21.

In the first and in the second region I, II, the piezoelectric element 2 has a polarization which runs parallel to the axis of symmetry, that is to say perpendicular to the circle surface, of the piezoelectric element 2. The third region III has a polarization which is in the opposite direction to that of the two regions I and II. The polarization directions are indicated by arrows in FIG. 2 and by the symbols + and − in FIG. 3.

A first transmission signal $S_1$ is applied to the first transmission electrode 22 via the first transmission signal line 221. This signal is additionally applied to an inverter 3. The inverter 3 is, for example, a transistor, an operational amplifier or a digital inverter. The output of the inverter 3 is connected via the second transmission signal line 231 to the second transmission electrode 23. As a result, a second signal $S_2$ is applied to the second transmission electrode 23, which second signal has the same amplitude as and is in antiphase with a first transmission signal $S_1$ applied to the first transmission electrode 22. The two transmission electrodes 22, 23 are therefore exited in antiphase. On account of the opposite polarization in the associated regions II, III, this excitation in antiphase leads to a uniform flexural vibration of the composite element comprising the piezoelectric element 2 and the diaphragm 12.

In the apparatus according to the invention, phase or phase difference in each case denotes the phase offset between the reception signal E and one of the two transmission signals $S_1$ or $S_2$. Since a fixed, constant phase relationship exists between the two transmission signals $S_1$ and $S_2$, both signals can equally be used as reference signal.

As already explained at the beginning in connection with the prior art, the reception signal E of the reception electrode 21 is also composed of a measurement signal $E_M$ and additional signals which are governed by essentially capacitive coupling. The polarization direction of the individual regions I, II, III is unimportant for the additional signals, which are produced by capacitive coupling. FIG. 2 illustrates an equivalent circuit diagram of the piezoelectric element 2. According to this, a capacitance $C_1$ exists between the first transmission electrode 21 and the reference electrode 20. Due to the symmetry, the same capacitance $C_1$ also exists between the second transmission electrode 23 and the reference electrode 20. A capacitance $C_2$ exists between the reception electrode 21 and the reference electrode 20. A capacitance $C^*$ exists between each transmission electrode 22, 23 and the reception electrode 21. The equivalent circuit diagram is thus symmetrical with respect to the axis of symmetry of the piezoelectric element 2. Two additional signals $E_{el1}$ and $E_{el2}$ are consequently superposed at the reception electrode 21, of which additional signals a first $E_{el1}$ is attributed to capacitive coupling of the first transmission electrode 22 and a second $E_{el2}$ is attributed to capacitive coupling of the second transmission electrode 23. Since the arrangement is symmetrical, the two additional signals $E_{el1}$, $E_{el2}$ have the same amplitudes. On account of the amplitude identity and the in-antiphase nature of the two transmission signals $S_1$ and $S_2$, the two additional signals $E_{el1}$, $E_{el2}$ are, however, in antiphase. The superposition of the two additional signals $E_{el1}$, $E_{el2}$ consequently means that the two signals $E_{el1}$, $E_{el2}$ cancel one another out.

By this means, a reception signal E which corresponds in a completely uncorrupted manner to the desired measurement signal and in which no additional signals at all are contained is available at the reception electrode 21.

The amplitude A and phase $\Delta\phi$ of the reception signal E have, as a function of the frequency, exactly like the measurement signal $E_M$, the profile which is typical of a harmonic oscillator.

As a result, the same fixed value of the phase difference $\Delta\phi_R$ between the first transmission signal $S_1$ and the reception signal E is always present at the resonant frequency $f_r$ of the mechanical oscillatory structure 1, irrespective of the oscillation quality of the system. The reception signal E is thus outstandingly suitable for the operation of a control loop which is used for setting the fixed phase relationship $\Delta\phi_R$ between the first transmission signal $S_1$ and the reception signal E.

An exemplary embodiment of a control loop of this type is illustrated in FIG. 2. In that case, the reception signal E is fed back to the first transmission signal $S_1$ via the reception signal line 6, via an amplifier 7 and a phase shifter 8, which shifts its phase by the specific, constant value $\Delta\phi_R$. The amplifier 7 should be dimensioned such that the self-excitation condition is satisfied. The mechanical oscillatory structure is consequently excited by means of the piezoelectric element 2 to produce oscillations at its resonant frequency $f_r$.

If the oscillatory structure is covered by the charge material, then the resonant frequency $f_r$ has a lower value than if the oscillatory structure oscillates freely. The fixed value of the phase difference is independent of whether or not the oscillatory structure is covered by the charge material.

The reception signal E is furthermore applied via the amplifier 7, the phase shifter 8 and the inverter 3 to the input of an evaluation unit 9. It is also possible to apply the unamplified, non-inverted reception signal E directly to the input. However, the obvious choice is to use the amplified signal. The inversion and the phase shifting do not have an adverse effect on the frequency of this signal.

Its frequency is determined by means of a frequency-measuring circuit 91 and the result is fed to a comparator 92. The latter compares the measured frequency with a reference frequency $f_R$ stored in a memory. If the measured frequency is less than the reference frequency $f_R$, the evaluation unit 9 emits an output signal which indicates that the mechanical oscillatory structure is covered by a charge material. If the frequency has a value which is greater than the reference frequency $f_R$, then the evaluation unit 9 emits an output signal which indicates that the mechanical oscillatory structure is not covered by the charge material.

We claim:

1. An apparatus for establishing and/or monitoring a predetermined filling level in a container, which apparatus comprises:
    a mechanical oscillatory structure (1), which is fitted at the level of the predetermined filling level,
    a piezoelectric element (2),
        which excites the oscillatory structure (1) to produce oscillations and picks up its oscillations,
        which has at least three regions,
            a first region (I) having a reception electrode (21), a second region (II) having a first transmission electrode (II) and a third region (III) having a second transmission electrode (23),
    the two transmission electrodes (22, 23) having an identical form and being arranged symmetrically with respect to one another and to the reception electrode (21),
    in the first and in the second region (I, II), the piezoelectric element (2) having a polarization which is in the opposite direction to a polarization of the third region (III), and
    a first transmission signal ($S_1$) being applied to the first transmission electrode (22), which first transmission signal has the same amplitude as and is in antiphase with a second transmission signal ($S_2$), which is applied to the second transmission electrode (23).

2. The apparatus as claimed in claim 1, in which a control loop is provided, which regulates a phase difference existing between the first transmission signal ($S_1$) and the reception signal (E) to a specific, constant value ($\Delta\phi_R$) at which the oscillatory structure (1) oscillates at a resonant frequency ($f_r$).

3. The apparatus as claimed in claim 1, in which a reference electrode (20) connected to a reference potential is arranged on the piezoelectric element (2).

4. The apparatus as claimed in claim 1, in which the piezoelectric element (2) is in the form of a disk and the reception electrode (21) and the two transmission electrodes (22, 23) are arranged on a circle surface of said element.

5. The apparatus as claimed in claim 4, in which the two transmission electrodes (22, 23) are annulus segments and are arranged on annulus segments of the circle surface which are diametrically opposite one another.

6. Apparatus as claimed in claim 1, in which the first transmission signal ($S_1$) is applied to an inverter (3) and the second transmission signal ($S_2$) is equal to an output signal of the inverter (3).

* * * * *